(12) United States Patent
Boswinkel et al.

(10) Patent No.: US 8,322,010 B2
(45) Date of Patent: *Dec. 4, 2012

(54) FASTENING TOOL WITH MODIFIED DRIVER TRAVEL PATH

(75) Inventors: Onno Boswinkel, Merrimack, NH (US); Robert Haynes, Bristol, NH (US)

(73) Assignee: Acme Staple Company, Inc., West Franklin, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/002,914

(22) Filed: Dec. 17, 2007

(65) Prior Publication Data

US 2008/0099529 A1   May 1, 2008

Related U.S. Application Data

(60) Division of application No. 11/041,355, filed on Jan. 24, 2005, now abandoned, which is a continuation of application No. 10/374,353, filed on Feb. 25, 2003, now Pat. No. 6,848,607.

(51) Int. Cl.
*B25C 1/04* (2006.01)

(52) U.S. Cl. .......... 29/428; 227/132; 227/140; 227/142; 227/151

(58) Field of Classification Search .................. 227/140, 227/109, 132, 142, 151, 123; 29/428
See application file for complete search history.

(56) References Cited

U.S. PATENT DOCUMENTS

| | | | |
|---|---|---|---|
| 2,285,512 A | 6/1942 | Harley | 227/132 |
| 2,637,030 A | 5/1953 | Wickman et al. | 227/151 |
| 2,746,043 A | 5/1956 | Zaller | 227/127 |
| 3,146,142 A | 8/1964 | Maly | 156/91 |
| 3,252,569 A | 5/1966 | Matthews | 206/56 |
| 3,305,156 A | 2/1967 | Khan | 227/132 |
| 3,757,629 A | 9/1973 | Schneider | 85/49 |
| 3,813,985 A | 6/1974 | Perkins | 85/49 |
| 3,853,606 A | 12/1974 | Parkinson | 117/128.4 |
| 3,958,738 A | 5/1976 | Tremblay | 227/109 |
| 4,655,222 A | 4/1987 | Florez et al. | 128/334 R |
| 4,664,733 A | 5/1987 | Masago | 156/212 |
| 4,732,309 A | 3/1988 | Judge | 227/109 |
| 5,149,237 A | 9/1992 | Gabriel et al. | 411/446 |
| 5,441,373 A | 8/1995 | Kish et al. | 411/442 |
| 5,476,687 A | 12/1995 | Gabriel et al. | 427/435 |
| 5,660,315 A | 8/1997 | Beavers et al. | 227/156 |
| 5,735,444 A | 4/1998 | Wingert | 227/120 |
| 5,794,832 A | 8/1998 | Chen | 227/109 |
| 5,882,405 A | 3/1999 | Kish et al. | 118/122 |
| 5,884,829 A | 3/1999 | Wingert | 227/151 |
| 5,918,790 A | 7/1999 | Donnell | 227/151 |
| 5,931,364 A | 8/1999 | Dennis | 227/109 |
| 6,082,604 A | 7/2000 | Dennis | 227/8 |
| 6,095,737 A | 8/2000 | Barker et al. | 411/359 |
| 6,848,607 B2 | 2/2005 | Boswinkel et al. | 227/132 |

*Primary Examiner* — Scott A. Smith
(74) *Attorney, Agent, or Firm* — Nields, Lemack & Frame, LLC

(57) ABSTRACT

Fastening tool for driving a fastener such as a staple into a substrate a predetermined distance. The tool includes a housing and a driver reciprocally mounted in the housing and moveable with respect to the housing, the driver having a driving surface for engaging a fastener such as a staple. A magazine assembly is associated with the housing for positioning and aligning the fastener in the path of the driver so that when actuated, the driver strikes the fastener and forcibly ejects it from the magazine into the substrate to a predetermined extent so as to adjust or control the holding power of the fastener about the object.

3 Claims, 5 Drawing Sheets

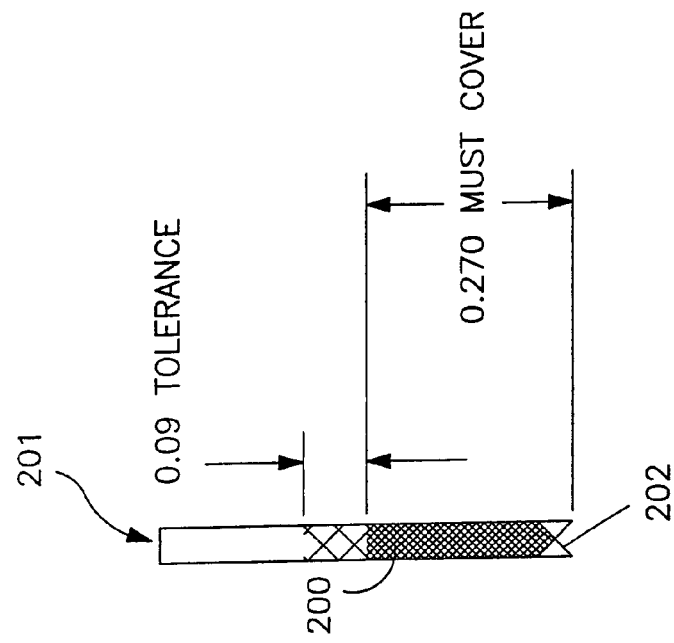
FIG. 6C
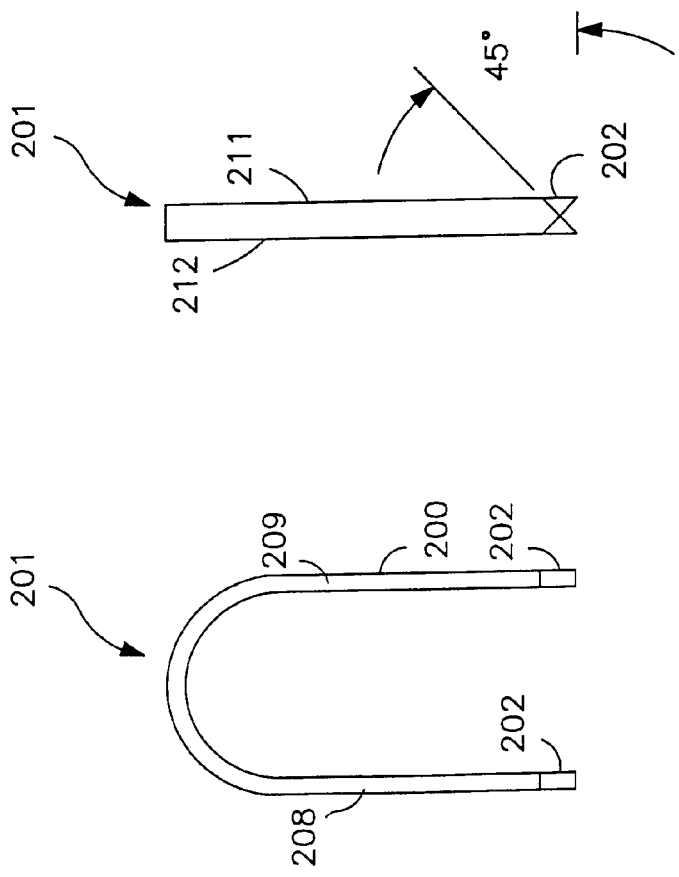
FIG. 6B
FIG. 6A

FASTENING TOOL WITH MODIFIED DRIVER TRAVEL PATH

This application is a divisional of U.S. Ser. No. 11/041,355 filed Jan. 24, 2005, now abandoned, which is a continuation of U.S. Ser. No. 10/374,353 filed Feb. 25, 2003 (now U.S. Pat. No. 6,848,607 issued Feb. 1, 2005), the disclosure of which is hereby incorporated by reference.

BACKGROUND OF THE INVENTION

The present invention is directed towards a staple gun or fastener driving or applying tool for driving staples or other fasteners into surfaces. In particular, the present invention relates to a fastening tool where the stroke length of the driver is modified to reduce or eliminate the impact of the fastener on the object being fastened.

Staple, nail, brad, screw and other fastener-driving applying tools for industrial, commercial and do-it-yourself (DIY) use are well known. Often such tools are used to secure cables, wires, tubing and the like to a substrate such as wood by driving the fastener into the substrate, the fastener thereby surrounding the cable, wire or tubing on three sides. However, the fastener being applied may at the time of application (due to the impact of the fastener) or subsequently (due to wire and/or substrate expansion or contraction over time) penetrate, damage or deform the item being fastened, resulting in an electrical short circuit, leak or other deleterious effect.

It is often desirable to attach or connect wire or cable, including without limitation high-speed transmission multimedia cable and wire (such as CAT-5 CAT-5e, CAT-6 RG6) and NM Building Wire (also known as "Romex" wire), to substrates using staples, alone or in combination with insulators. The use of these so-called insulators, which may also provide a cushioning function, minimizes the possibility that the staple will penetrate, damage or deform the sheathing on the wire and cause an electrical short or change in current. The use of pre-assembled individual staples and insulators, installed by means of a hammer or similar implement, is conventional. However, this method is slow, tedious, and not very precise.

Proper installation of staples must meet industry requirements for staple holding power (such as those described in UL specifications) for a wide range of wire types and diameters used in typical residential and commercial construction. However, if the fastener is driven too deeply into the substrate, the fastener can deform the wire, cable, tube or other object being fastened.

It is therefore an object of the present invention to provide an improved fastener driving tool or gun that ensures consistent, uniform and reproducible driving depth of the fastener into the substrate.

It is a still further object of the present invention to provide a fastening device that automatically and repeatably drives fasteners to a predetermined depth into a substrate to connect an object thereto.

It is yet a further object of the present invention to provide a fastening device that is capable of reproducibly driving a fastener into a substrate to a pre-determined depth.

It is a still further object of the present invention to provide an improved impact pad for a fastener or driving tool or gun that helps minimize or eliminate the possibility that the fastener penetrates, damages or deforms the wire or other object being fastened.

SUMMARY OF THE INVENTION

The problems of the prior art have been overcome by the present invention, which provides a fastening tool for driving a fastener into a substrate wherein the length of the drive stroke of the driver is limited. That is, the path of the drive blade has been modified (relative to conventional staple guns) in order to ensure that the fastener is positioned with respect to the object to be fastened such that desired tension of the fastener on the object to be fastened, the desired holding power of the fastener, and the desired movement of the object to be fastened under the fastener, are achieved.

The tool includes a housing and a driver reciprocally mounted in the housing and moveable with respect to the housing, the driver having a driving surface for engaging a fastener such as a staple. A magazine assembly is associated with the housing for holding one or more fasteners, and for positioning and aligning a fastener in the path of the driver so that when actuated, the driver strikes the fastener and forcibly ejects it from the magazine into the substrate onto which the object is to be fastened. Suitable fasteners include staples (of various sizes and configurations), nails, brads, rivets, etc.

In one embodiment, the drive stroke of the driver terminates upon contact with an impact pad of appropriate dimension and composition appropriately positioned in the path of the driver so as to effectively limit the length of the drive stroke to achieve the desired fastening.

BRIEF DESCRIPTION OF THE DRAWINGS

FIG. 6A is a front view of an angled fastener in accordance with an embodiment of the present invention;

FIG. 6B is a side view of the fastener of FIG. 6A; and

FIG. 6C is a side view of the fastener of FIG. 6A coated with a resin.

DETAILED DESCRIPTION OF THE INVENTION

Figure 1:
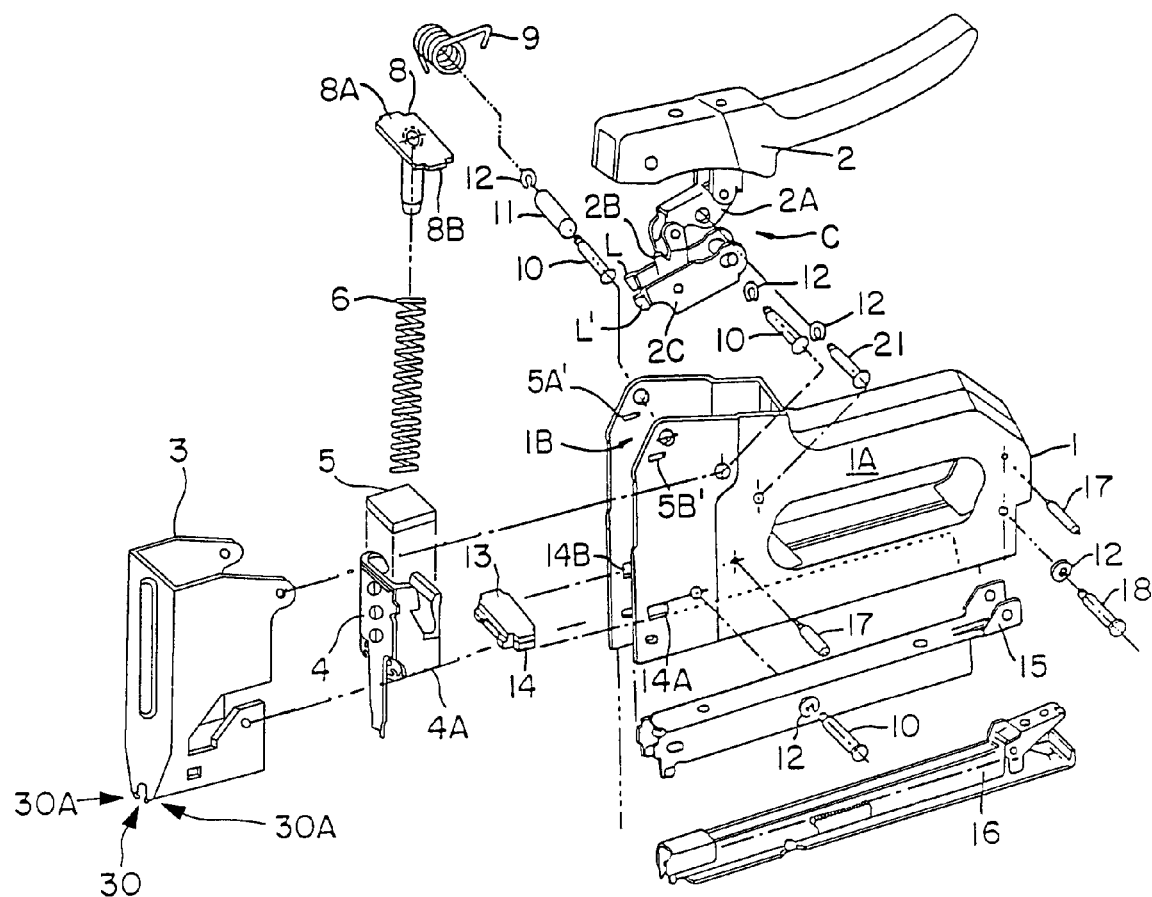
FIG. 1 is an exploded view of a fastening tool in accordance with the present invention.

Turning first to FIG. 1, there is shown one embodiment of the present invention, which is a spring actuated staple gun adapted to drive U-shaped staples housed in a magazine into a surface or substrate. The gun includes a tool body 1 comprised of two stamped nickel-plated sheet metal sides 1A and 1B that form a housing there between. Alternatively, the housing could be a cast or molded body. Pivotally fixed to the underside of a handle 2 is a spring-loaded lever assembly C, substantially located in said housing, which includes extended link 2A and lifter 2C and allows the handle of the gun to be depressed to actuate the gun and released in order to reset the actuation mechanism. A handle return spring 9 is fixed to the handle 2. Spring retainer 8 has opposite flanges 8A, 8B that align with opposite slots 5A' 5B' in sides 1A and 1B of the tool body 1 to fix spring retainer 8 therein. A driver spring pad 5 aligns with the bottom of the driver spring 6 and sits in the body of driver assembly 4. Impact pad 13 has an impact ledge 14 that aligns with opposite slots 14A and 14B in sides 1A and 1B of the tool body 1 to fix the same in the housing, and thereby limit the downward movement of driver blade assembly 4 a predetermined amount by preventing the seat 4A of driver assembly 4 from extending past the top surface of the impact pad 13. Nose piece 3 secures over the driver assembly 4 as is conventional in the art. Magazine assembly 15 combines with pusher assembly 16 to selectively provide the supply of fasteners into the path of the driver blade.

Pressing downward on the handle 2 first causes a pair of opposite lips L, L' of lifter 2C, which lips engage the driver assembly 4, to lift the driver assembly 4 upward against the bias of driver spring 6. Further downward pressure of the handle 2 causes the lips L, L' to release from the driver assembly 4, thereby causing the driver spring 6 to force the driver assembly 4 downward. The downward force imparted to the driver assembly 4 by the spring 6 causes the head H of the driver assembly to strike a staple or other fastener located at the forwardmost end of the magazine assembly 15 and in the path of the driver, and drive the staple or fastener into the work surface below. Those skilled in the art will recognize that other ways to actuate the driver, including any stored energy source (such as leaf springs, torsion springs, electricity, hydraulics and compressed gas (e.g. air)) can be used.

Figure 2:
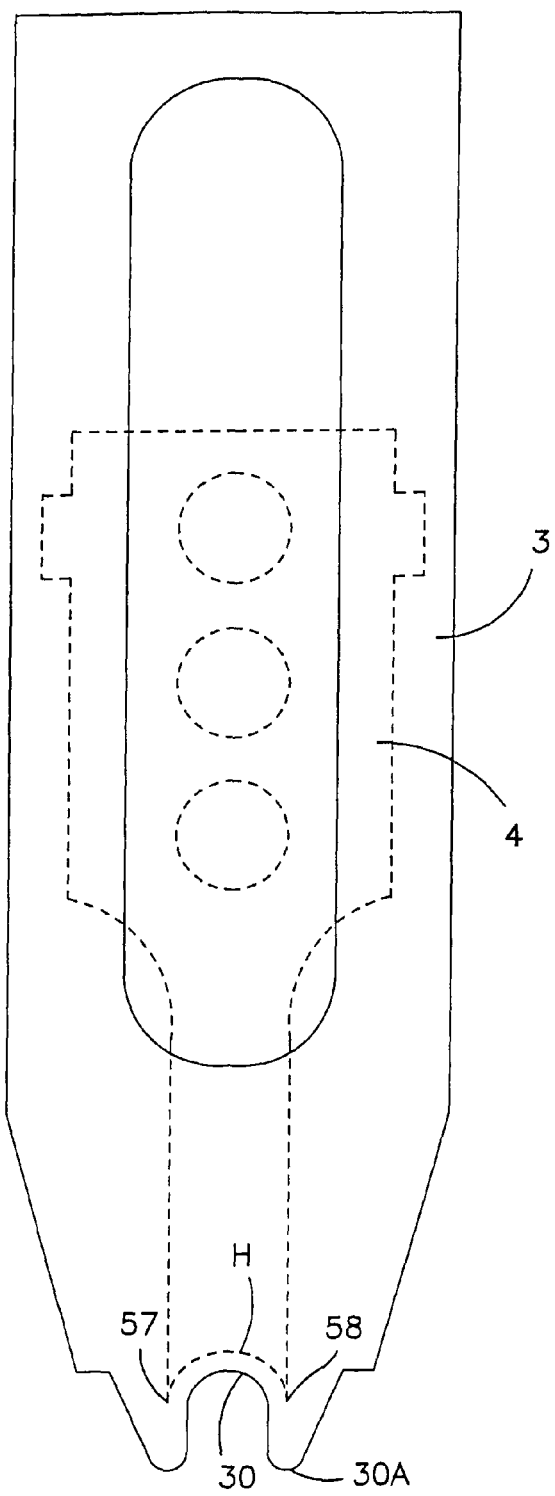
FIG. 2 is a front view of the driver and nosepiece in accordance with the present invention.
Figure 3:
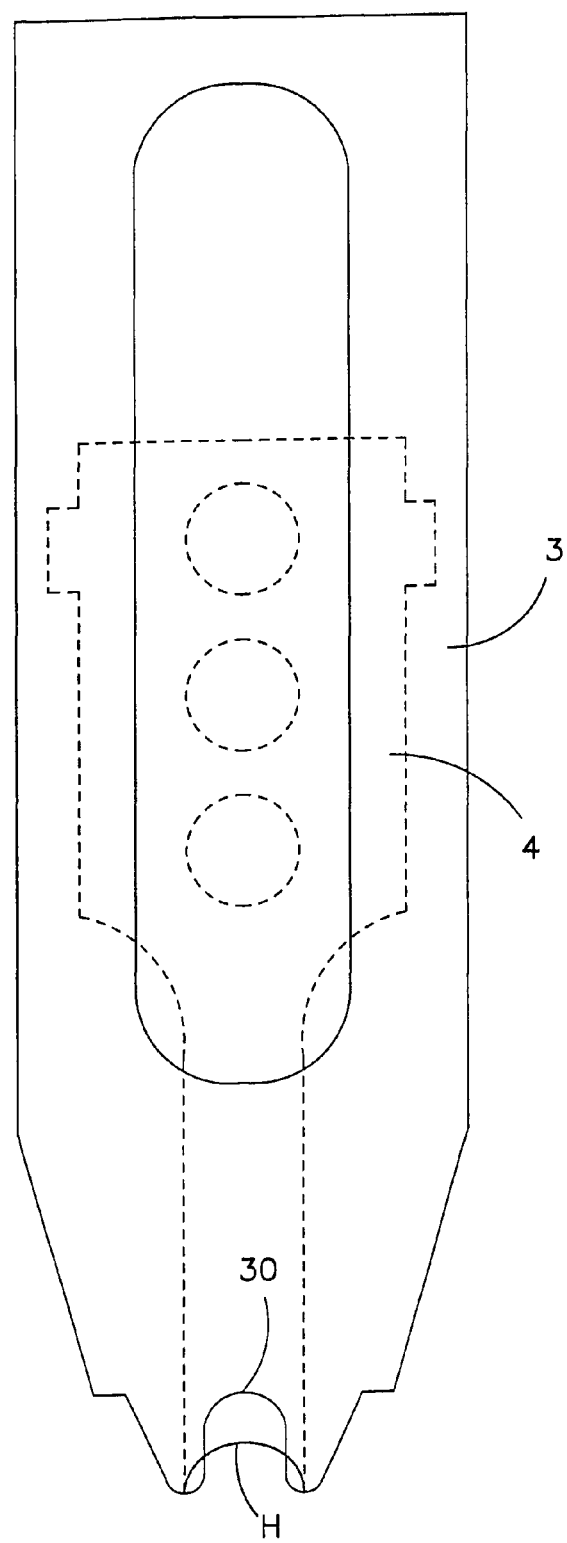
FIG. 3 is a front view of the driver and nose piece with the driver actuated in accordance with the present invention.

Turning now to FIGS. 2 and 3, the details of a drive blade suitable for use with conventional staples are shown. The head H of the driver 4 is configured to correspond in shape to the top (or crown) portion of the staple or fastener (not shown), and the radiused transitional areas (shoulders) which join the crown to the staple legs so that upon impact, the driver 4 squarely engages the staple crown and shoulder portions and forces the staple straight out of the tool and into the substrate. Thus, the center portion of the head H is recessed slightly, with spaced opposite tips 57, 58 extending lower than the recessed portion, and being radiused as shown. The length of the blade 4 is predetermined and depends in part on the length of the staple and the characteristics of the substrate into which the staple is being driven, so that the staple does not penetrate into the substrate too deeply. Typical substrates include standard wood building materials used in studs, joists, rafters, etc.

Nose piece 3 secures over the driver 4. At its sides, the nose piece 3 extends below the driver as shown in FIG. 3. A notch 30, such as a U-shaped notch, is formed in the bottom of the nose piece 3. This notch 30 provides a receptacle and guide for the wire or other object to be fastened to be positioned relative to the staple gun. The bottom of the driver 4 at rest is in a specified relationship to the bottom of the nosepiece 30A. This orientation of the driver 4 and the bottom of the nosepiece insures that the staple tool does not drive the fastener too deeply, thereby possibly crushing, damaging or deforming the object to be fastened. This relationship also inhibits damage to the object if the gun is fired on a cable without fasteners in the magazine. This distance may vary, based on varying the thickness of the crown portion of the fastener.

The staple gun of the preferred embodiment of the present invention is adapted to drive U-shaped staples (releasably interconnected in the staple magazine) into a substrate in order to connect an object such as wire, cable or tubing to the substrate.

Those skilled in the art will recognize that any stored energy source can be used to actuate the driver of the fastening tool, including, without limitation, mechanical means, compressed air, electric means, hydraulics, etc.

In one embodiment of the present invention, the impact pad 13 affects the location of the bottom H of the driver in the "rest" (down) position as it relates to the bottom of the nosepiece 30A, and thereby controls the extent to which the driver drives the fastener over the object and into the substrate. For example, the modification of the dimensions and/or location of the impact pad can be designed to prevent the driver from driving the staple too tightly over the wire or object being fastened regardless of the diameter of the wire or object.

Figure 4:
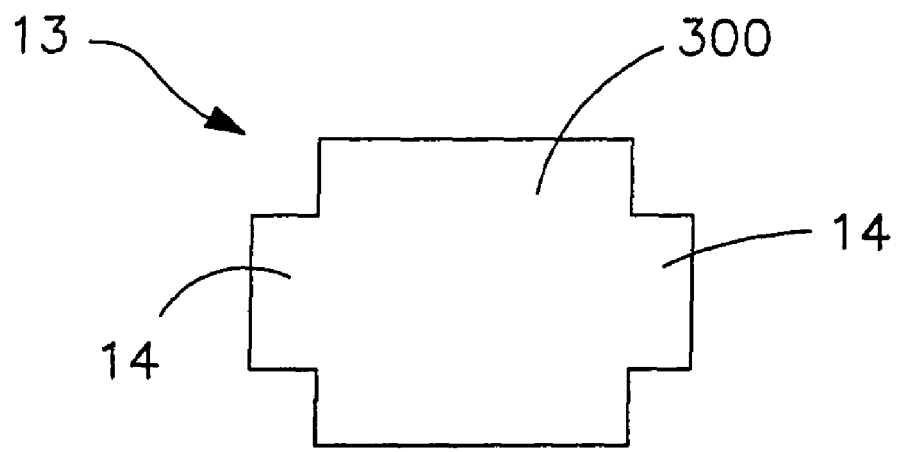
FIG. 4 is a top view of the impact pad in accordance with the present invention.
Figure 5:
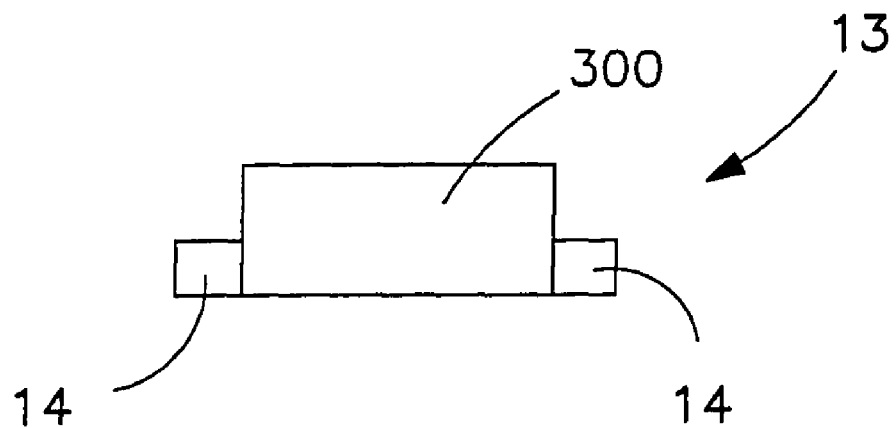
FIG. 5 is a cross-sectional view of the impact pad in accordance with the present invention.

Turning now to FIGS. 4 and 5, the modified impact pad 13 of this embodiment is illustrated. In the embodiment shown, impact pad 13 is fixed in the housing of the fastening tool with a pair of opposite ledges 14 that extend beyond the main body 30 of the impact pad 13 a sufficient distance to align with respective opposite slots 14A and 14B (FIG. 1) in the sides 1A and 1B of the tool body 1.

As can be best seen in FIG. 5, the height or thickness of the main body 300 of the impact pad 13 preferably extends higher than the height of the ledges 14, and is higher or thicker than that of conventional impact pads. For example, the height of the main body in conventional impact pads is about 0.125 inches. In this embodiment of the present invention, the height of the impact pad main body 300 has been modified to about 0.250 inches.

By so constructing the impact pad 13, the fastener of the present invention is designed to fire a fastener about an object to connect it to a substrate without deforming the object. That is, in this embodiment, the height above the substrate at which the driver stops driving the fastener is greater than that conventionally used, so that the fastener does not penetrate as deeply into the substrate. Preferably the fastener penetrates into the substrate enough to attach the object thereto, yet enables the object to remain loose, and therefore be moved, under the fastener. Although slight contact between the fastener and the object being fastened is acceptable and desirable, it is within the scope of the present invention to retain an object in place on a substrate by surrounding the object with the fastener without contacting the object with the fastener, thereby maintaining a gap between the object and the fastener. The length of the drive path of the driver is thus predetermined to be such that upon actuation of the driver and firing of the fastener, a minimum predetermined distance between the substrate and the underside of the top (e.g., crown) of the fastener (e.g., staple) is maintained, such minimum predetermined distance being equal to or greater than the diameter or height of the object being attached to that substrate.

Similarly, the driver path can be modified so that the fastener more tightly engages the object and penetrates more deeply into the substrate. Those skilled in the art will appreciate the flexibility of the present invention is such that the holding power and movement of the object being held can be modified to virtually any degree desired by modifying the drive path of the driver accordingly.

Other ways to achieve the objectives of the present invention can be used. For example, the length of the driver itself can be shortened, so as to effectively shorten its path of travel. Alternatively, by modifying the linkage fulcrum pivot points of the tool, the driver path length can be shortened. Alternatively, by lowering the bottom of the nose piece, the distance between the substrate and the underside of the top (e.g., crown) of the fastener (e.g., staple) can be modified.

In operation, the fastening tool of the preferred embodiment of the present invention can be used as follows. First, cohered cores or individual articles such as fasteners (e.g., staples) are loaded into the magazine. The tool is then aligned over the object to be fastened. Upon actuation of the driver, fasteners are expelled from the magazine, one at a time, around the object to be fastened on three sides and into the substrate. The staple pusher in the magazine assembly automatically urges the next article into axial alignment with the drive path to be expelled by the next complete drive stroke. The path of the driver is effectively shortened, preferably by the driver impacting the impact pad sooner than conventional, so that the staple does not deform the object to be fastened.

In another embodiment of the present invention, the fasteners 201, preferably staples, include angled divergent fastener points as shown in FIGS. 6A, 6B and 6C, designed to increase the friction with the substrate when driven into the substrate. This increased friction causes the fastener to stop its penetration into the substrate sooner than otherwise. More specifically, the fastener 201, such as a wire ribbon, is U-shaped or substantially U-shaped and includes first and second legs or extremities 208, 209. The ribbon has a first edge 211 and a second edge 212. The first extremity 208 is cut away at an angle or chamfered in the area approaching its free end, such that the first edge 211 forms a point and projects further than the second edge 212. Similarly, the second extremity 209 is cut away an angle or chamfered in the area approaching its free end, such that the second edge 212 forms a point and projects further than the first edge 211.

The more horizontal the angle of the legs, the more the legs diverge, and the more friction that is created. Suitable angles range from about 30° to about 60° from parallel to the surface of the substrate, with each leg of the staple diverging in opposite directions, i.e., away from each other. A preferred angle is about 45°. The angle of the chamfer on each extremity need not be the same, although it is preferred that they are.

Alternatively or in addition, the fastener legs can be coated with a resin 200 (FIG. 6C) that liquefies from the heat from friction generated during application. This allows for easier initial penetration into the substrate. A suitable material is an acrylic/nitrocellulose resin compound, modified with a plasticizer, with the acrylic being the major component, such as UPACO #ST 1685 Withdrawal Coating. Preferably the resin is a combination cement with chemical components that melt at or below the temperature created from the friction caused during fastener application. Preferably the resin is coated to a thickness of from about 0.001 to about 0.0025 inches on the outside face of each fastener leg or extremity, generally half to two-thirds up the leg from the free end of the fastener leg.

What is claimed is:

1. A method of connecting an article to a substrate, comprising the steps of:
    a) providing a fastening tool comprising:
        a housing;
        a driver mounted in said housing for reciprocal movement in a drive path;
        a magazine assembly associated with said housing, said magazine assembly containing one or more fasteners including a forwardmost fastener, said magazine assembly having a nose end and a tail end spaced from said nose end;
    b) determining the desired holding power of said fastener about said article;
    c) configuring the length of said drive path based upon said desired holding power;
    d) properly positioning said fastening tool about said article to be fastened; and
    e) actuating said driver thereby causing said driver to travel said configured length in said drive path and strike said forwardmost fastener and propel said forwardmost fastener out of said housing and into said substrate about said article to such an extent that said article is connected to said substrate with said desired holding power and remains permanently movable beneath said fastener.

2. The method of claim 1, wherein said at least one fastener is a staple.

3. The method of claim 1, wherein said fastening tool further comprises an impact pad in said housing in said drive path, and wherein said desired holding power is achieved based upon the thickness of said impact pad.

* * * * *